(12) United States Patent
Schreiner et al.

(10) Patent No.: US 8,781,984 B2
(45) Date of Patent: Jul. 15, 2014

(54) TECHNIQUES FOR GENERATING A TRUSTWORTHINESS SCORE IN AN ONLINE ENVIRONMENT

(76) Inventors: Ben Schreiner, Walnut Creek, CA (US); Don Pettey, Manitou Springs, CO (US); Dennis King, Colorado Springs, CO (US)

(*) Notice: Subject to any disclaimer, the term of this patent is extended or adjusted under 35 U.S.C. 154(b) by 290 days.

(21) Appl. No.: 13/204,011

(22) Filed: Aug. 5, 2011

(65) Prior Publication Data

US 2012/0072384 A1 Mar. 22, 2012

Related U.S. Application Data

(60) Provisional application No. 61/370,999, filed on Aug. 5, 2010.

(51) Int. Cl.
*G06F 17/00* (2006.01)

(52) U.S. Cl.
USPC .................................... 706/45; 705/347

(58) Field of Classification Search
USPC ............................................. 706/45
See application file for complete search history.

(56) References Cited

U.S. PATENT DOCUMENTS

| | | | |
|---|---|---|---|
| 8,170,958 B1 * | 5/2012 | Gremett et al. | 705/347 |
| 8,359,632 B2 * | 1/2013 | Guo et al. | 726/3 |
| 2008/0077517 A1 * | 3/2008 | Sappington | 705/35 |
| 2008/0109491 A1 * | 5/2008 | Gupta | 707/104.1 |
| 2008/0189164 A1 * | 8/2008 | Wiseman et al. | 705/10 |
| 2010/0114744 A1 * | 5/2010 | Gonen | 705/35 |
| 2010/0115040 A1 * | 5/2010 | Sargent et al. | 709/206 |
| 2011/0055923 A1 * | 3/2011 | Thomas | 726/23 |
| 2011/0153551 A1 * | 6/2011 | Gabriel et al. | 707/603 |
| 2011/0208687 A1 * | 8/2011 | Dube et al. | 706/54 |
| 2013/0173616 A1 * | 7/2013 | Fekri et al. | 707/736 |

FOREIGN PATENT DOCUMENTS

EP 2256675 A1 * 12/2010 ............. G06Q 10/00

OTHER PUBLICATIONS

Nurmi. Bayesian Game Theory in Practice. Department of Computer Science, University of Helsinki Technical Report Series of Publications C, Report C-2005-10. Helsinki, Mar. 2005, 22 pages.*

* cited by examiner

*Primary Examiner* — Jeffrey A Gaffin
*Assistant Examiner* — David H Kim
(74) *Attorney, Agent, or Firm* — Eschweiler & Associates, LLC

(57) ABSTRACT

Some embodiments of this disclosure relate to techniques for determining trustworthiness scores for entities in an online environment. Often, the techniques gather behavioral information regarding entities from a number of different online sources, and then process this information to generate the trustworthiness scores. In some embodiments, a portion of one entity's score can be scaled with regards to a corresponding portion of another entity's score. In still other embodiments, an entity can be provided with a trustworthiness score that has different category components.

21 Claims, 12 Drawing Sheets

| User | Membership Points | Time on Report | Activity Points | Total Points | Source Adjusted |
|---|---|---|---|---|---|
| Aaron | 59 | 5 | 174 | 238 | 190 |
| Beth | 287 | 10 | 209 | 506 | 405 |
| Carl | 226 | 20 | 140 | 386 | 308 |
| David | 43 | 30 | 259 | 332 | 265 |
| Erica | 330 | 40 | 44 | 414 | 331 |
| Frank | 143 | 30 | 135 | 308 | 246 |
| Gary | 65 | 5 | 550 | 620 | 496 |
| Helen | 124 | 15 | 0 | 139 | 111 |
| Isabel | 400 | 50 | 197 | 647 | 518 |
| Jane | 17 | 5 | 94 | 116 | 93 |

FIG. 10A

| User | Membership Length at Source | First 12 Months (2 pts/mo) | Next 24 Months (3 pts/mo) | After 36 Months (4 pts/mo) | Total | Membership Score (400 Max) |
|---|---|---|---|---|---|---|
| Aaron | 13 | 24 | 3 | | 27 | 59 |
| Beth | 45 | 24 | 72 | 36 | 132 | 287 |
| Carl | 38 | 24 | 72 | 8 | 104 | 226 |
| David | 10 | 20 | 0 | | 20 | 43 |
| Erica | 50 | 24 | 72 | 56 | 152 | 330 |
| Frank | 26 | 24 | 42 | | 66 | 143 |
| Gary | 14 | 24 | 6 | | 30 | 65 |
| Helen | 23 | 24 | 33 | | 57 | 124 |
| Isabel | 58 | 24 | 72 | 88 | 184 | 400 |
| Jane | 4 | 8 | 0 | | 8 | 17 |
| MAX | | | | | 184 | |

FIG. 10B

| User | Months Source on Report | Score (1pt/mo) | Time on Report Score (50 Max) |
|---|---|---|---|
| Aaron | 1 | 1 | 5 |
| Beth | 2 | 2 | 10 |
| Carl | 4 | 4 | 20 |
| David | 6 | 6 | 30 |
| Erica | 8 | 8 | 40 |
| Frank | 6 | 6 | 30 |
| Gary | 1 | 1 | 5 |
| Helen | 3 | 3 | 15 |
| Isabel | 10 | 10 | 50 |
| Jane | 1 | 1 | 5 |
| MAX | | 10 | |

FIG. 10C

| User | Reputation Points | Adjusted Reputation Points (Max 200) | Out of Score | Total | Activity Score (Max 550) |
|---|---|---|---|---|---|
| Aaron | 173 | 8 | 80 | 88 | 174 |
| Beth | 132 | 6 | 100 | 106 | 209 |
| Carl | 227 | 11 | 60 | 71 | 140 |
| David | 2288 | 112 | 20 | 132 | 255 |
| Erica | 53 | 3 | 20 | 23 | 44 |
| Frank | 175 | 9 | 60 | 69 | 135 |
| Gary | 4098 | 200 | 80 | 280 | 550 |
| Helen | 1 | 0 | 0 | 0 | 0 |
| Isabel | 11 | 1 | 100 | 101 | 197 |
| Jane | 159 | 8 | 40 | 48 | 94 |
| MAX | 4098 | | | 280 | |

FIG. 10D

| User | Average Source Score | Number of Sources in Average | Diversity Multiplier | Diversity Weighted Source Score | Base Trust Score (Max 700) | Renaissance Man (Max 100) | Referral Score (Max 200) | Global Score | Percentile |
|---|---|---|---|---|---|---|---|---|---|
| Aaron | 548 | 4 | 1 | 548 | 700 | 25 | 0 | 725 | 90 |
| Beth | 449 | 5 | 1 | 449 | 574 | 33 | 0 | 607 | 80 |
| Carl | 176 | 2 | 0.75 | 132 | 169 | 50 | 0 | 219 | 10 |
| David | 212 | 5 | 1 | 212 | 271 | 58 | 0 | 329 | 40 |
| Eric | 343 | 3 | 1 | 343 | 438 | 63 | 0 | 501 | 60 |
| Frank | 280 | 6 | 1 | 280 | 358 | 21 | 0 | 378 | 50 |
| Gary | 496 | 2 | 0.75 | 372 | 475 | 100 | 200 | 775 | 100 |
| Helen | 111 | 10 | 1.25 | 139 | 177 | 25 | 43 | 245 | 30 |
| Isabel | 560 | 2 | 0.75 | 420 | 536 | 8 | 0 | 545 | 70 |
| Jane | 117 | 7 | 1.25 | 146 | 187 | 50 | 0 | 237 | 20 |
| MAX | | | | 548 | | | | | |

FIG. 10E

|  | Median Sources | Less than .6*Median | Greater Than 1.4*Median |
|---|---|---|---|
|  | 4.5 | 2.7 | 6.3 |
| Diversity Multiplier | 1 | 0.75 | 1.25 |

FIG. 10F

| User | Number of Categories | Average # of Sources Per Category | Total | Score (Max 100) |
|---|---|---|---|---|
| Aaron | 2 | 3 | 6 | 25 |
| Beth | 4 | 2 | 8 | 33 |
| Carl | 3 | 4 | 12 | 50 |
| David | 7 | 2 | 14 | 58 |
| Erica | 5 | 3 | 15 | 63 |
| Frank | 1 | 5 | 5 | 21 |
| Gary | 6 | 4 | 24 | 100 |
| Helen | 2 | 3 | 6 | 25 |
| Isabel | 1 | 2 | 2 | 8 |
| Jane | 3 | 4 | 12 | 50 |
| MAX |  |  | 24 |  |

FIG. 10G

| User | Number of Sources | Average Score in Category | Source Points (Max 250) | Score Points (Max 750) | Category Score |
|---|---|---|---|---|---|
| Aaron | 4 | 548 | 125 | 734 | 859 |
| Beth | 8 | 449 | 250 | 601 | 851 |
| Carl | 3 | 176 | 94 | 236 | 329 |
| David | 6 | 232 | 188 | 311 | 498 |
| Erica | 1 | 343 | 31 | 459 | 491 |
| Frank | 5 | 280 | 156 | 375 | 531 |
| Gary | 7 | 496 | 219 | 664 | 883 |
| Helen | 2 | 111 | 63 | 149 | 211 |
| Isabel | 2 | 560 | 63 | 750 | 813 |
| Jane | 5 | 117 | 156 | 157 | 313 |
| MAX | 8 | 560 |  |  |  |

FIG. 10H

TECHNIQUES FOR GENERATING A TRUSTWORTHINESS SCORE IN AN ONLINE ENVIRONMENT

RELATED APPLICATION

This application claims priority to U.S. Application No. 61/370,999 filed on Aug. 5, 2010.

BACKGROUND

Trust has long been valued as evidence of character and reliability of an entity, such as an individual, an organization, a company, or a government. However, due to the distributed nature of the Internet and the at least semi-anonymity of entities on the Internet, it has historically been difficult to evaluate whether an entity is trustworthy in an online environment. Furthermore, different websites may use different metrics for evaluating the trust of an individual. Therefore, it may be difficult to compare trust evaluations of an individual from different websites. Additionally, if an entity seeks to establish a trust relationship with a new website, the entity may be forced to essentially start from scratch at the new website because different websites do not typically share trust data (e.g., because of privacy concerns).

Accordingly, this patent application relates to improved techniques for determining trustworthiness in an online environment.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Some embodiments of this disclosure relate to techniques for determining trustworthiness scores for entities in an online environment. Often, the techniques gather behavioral information regarding entities from a number of different online sources, and then process this information to generate the trustworthiness scores. In some embodiments, a portion of one entity's score can be scaled with regards to a corresponding portion of another entity's score. In still other embodiments, an entity can be provided with a number of trustworthiness scores associated with different trust categories.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DESCRIPTION OF THE DRAWINGS

FIGS. 10a-10h relate to an illustrative example of data used and/or produced by described methods.

DETAILED DESCRIPTION

Figure 1:
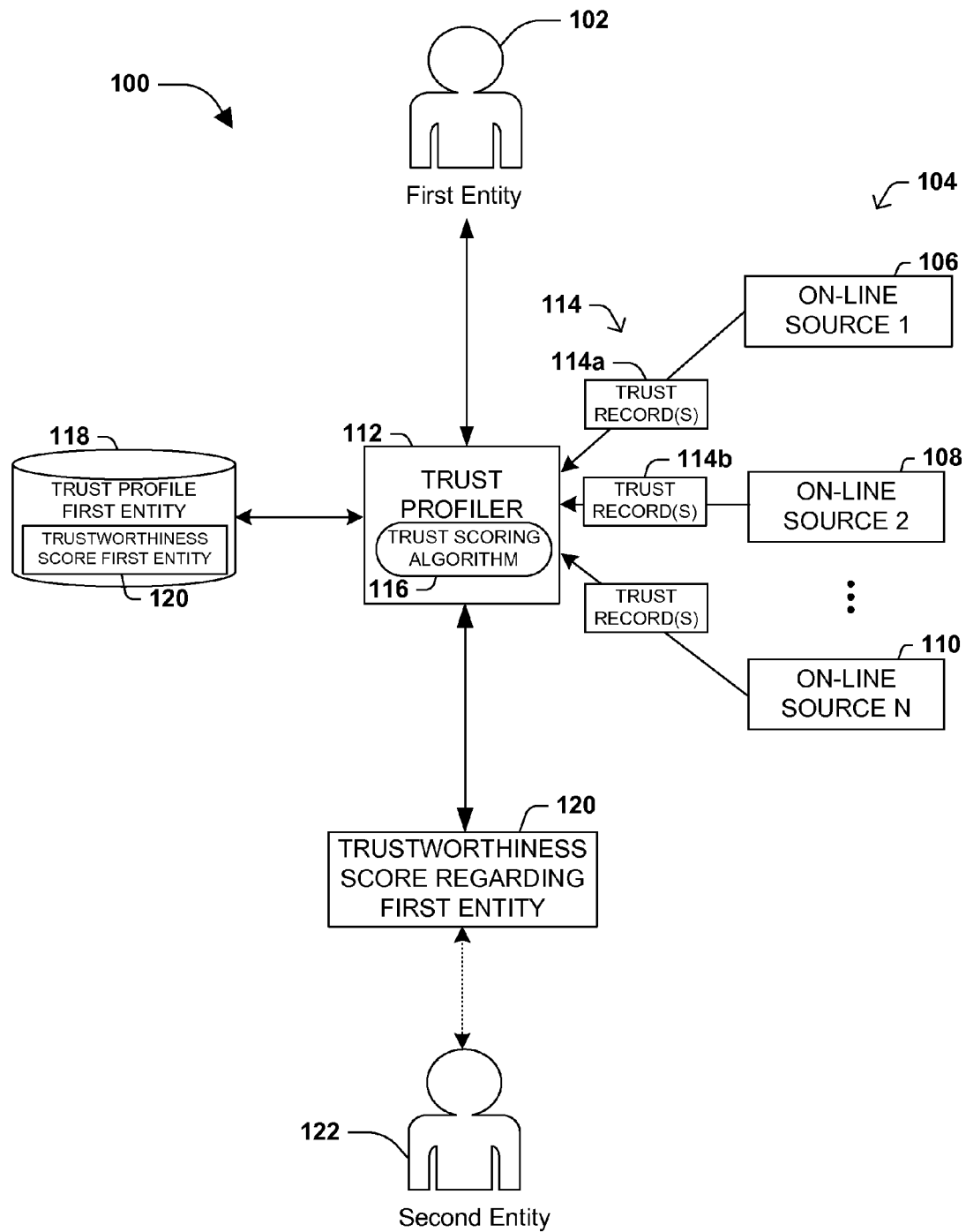
FIG. 1 relates to an example system where a single entity engages a trust profiler which generates a trustworthiness score for the entity based on a number of different online sources.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Figure 2:
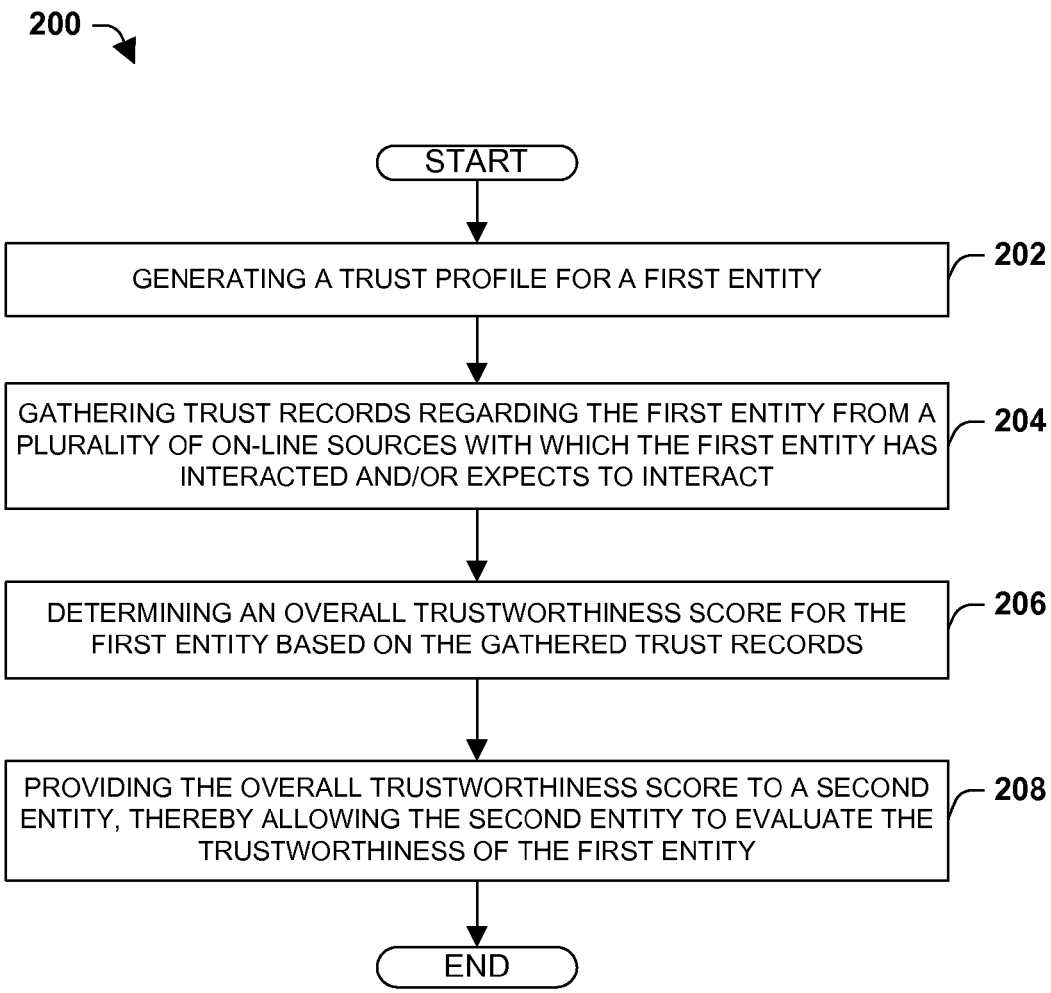
FIG. 2 relates to an example method where a single entity engages a trust profiler which generates a trustworthiness score for the entity based on a number of different online sources.
Figure 3:
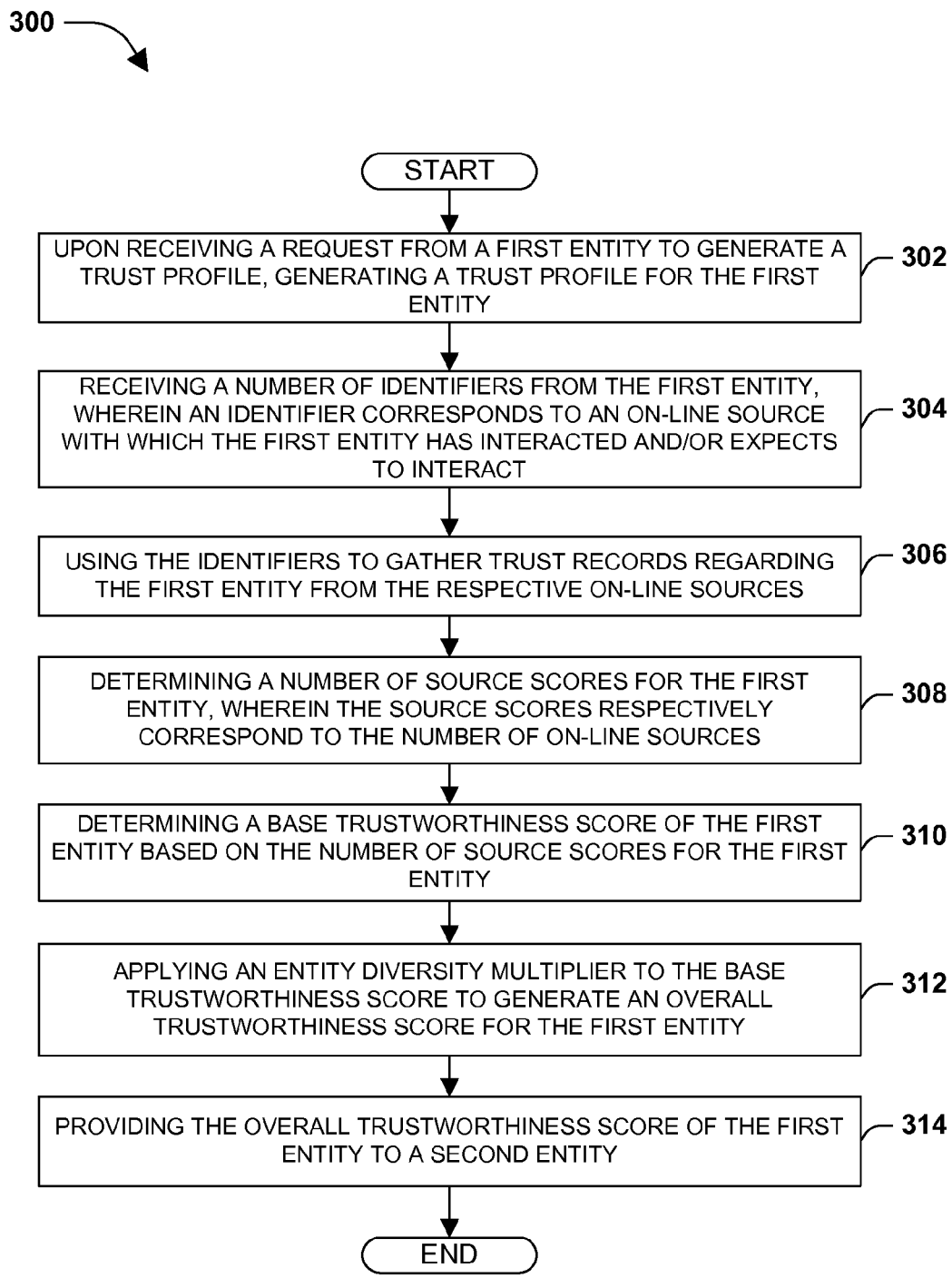
FIG. 3 relates to an example method where a single entity engages a trust profiler which generates a trustworthiness score for the entity based on a number of different online sources.

FIGS. 1-3 generally relate to an embodiment wherein a first entity 102 engages a trust profiler 112 (e.g., a server) to generate a trustworthiness score 120 regarding the entity 102. The first entity 102 may be, for example, a person or organization acting through an online profile via, for example, a desktop computer, a laptop computer, a mobile device, and so forth. The trustworthiness score 120 can be provided to a second entity 122, thereby allowing the second 122 to evaluate the trustworthiness of the first entity 102.

FIG. 1 depicts a system 100 of one such embodiment. In this example, a first entity 102 has various relationships with a number of different online sources 104 (e.g., a first online source 106, a second online source 108, and an Nth online source 110). For example the first online source 106 could be an auction website, the second online source 108 could be an online retailer website, and the Nth online source 110 could be a social networking website. The first entity 102 has various behavioral histories with the different online sources 104.

A trust profiler 112 comes to know about the first entity's relationships with these different online sources 104, and gathers trust records 114 from the online sources 104 indicative of these interactions. In some embodiments, the trust records may have different formats for different online sources. For example, trust record 114a can have one format describing detailed records of the first entity's interactions with other users of the auction site, while trust record 114b can have another format merely indicating a score generated based on the first entity's purchases through the online retailer. In other embodiments, the trust records 114 may follow a standardized format. The trust profiler 112 uses these trust records 114, in conjunction with a trust scoring algorithm 116 carried out on hardware of the trust profiler, to generate a trust profile 118 for the first entity 102. Included in this trust profile 118 is a trustworthiness score 120. In some embodiments, the trustworthiness score 120 can have a numerical value ranging between a minimum value (e.g., 0) to a maximum value (e.g., 1000), wherein the minimum trustworthiness score indicates a complete lack of trustworthiness and a maximum trustworthiness score indicates extremely good trustworthiness.

The trustworthiness score 120 can be provided to a second entity 122, thereby allowing the second entity 122 to evaluate the trustworthiness of the first entity 102. The second entity 122 may be a person or a business. In another example, the second entity 122 may be a logic that may be configured to automatically make a decision using the trustworthiness score 120. The trustworthiness score 120 is often provided to the second entity 122 upon the second entity 122 requesting the trustworthiness score of the first entity from the trust profiler 112, although other implementations are also possible. For example, the trustworthiness score of the first entity may be provided to the second entity automatically if the second entity attempts to view a profile of the first entity on a website. In another example, the trustworthiness score of the first entity may be provided automatically to the second entity when second entity reviews transactions initiated by the first entity.

As will be appreciated in more detail with regards to other embodiments disclosed herein, in some implementations (e.g., FIGS. 4-6) a trust profiler may calculate different trustworthiness scores for different respective entities. The trust profiler may then scale a portion of one entity's score based on a corresponding portion of another entity's score. In still other embodiments (e.g., FIGS. 7-8), the trust profiler can categorize the online sources into different categories and provide a category score that has different category components. Such an embodiment allows different facets of a first entity's trustworthiness to be evaluated independently by a second entity to make a decision. For example, even if the second entity is hesitant to deal with the entity in commercial online dealings (e.g., because the first entity's commercial trustworthiness score component is low), the second entity may be happy to deal with the first entity with regards to professional matters (e.g., because the first entity's professional score is extremely high). These embodiments may be combined in any number of manners, wherein all such permutations are contemplated as falling within the scope of the present invention.

FIG. 2 shows one example of method 200 consistent with FIG. 1's embodiment. The method 200 starts at 202, were in a trust profile is generated for a first entity. At block 204 the method 202 gathers trust records regarding the first entity from a number of online sources with which the first entity has interacted and/or expects to interact. At block 206, an overall trustworthiness score for the first entity is determined based on the gathered trust records. At block 208, an overall trustworthiness score is provided to a second entity, thereby allowing the second entity to evaluate the trustworthiness of the first entity.

FIG. 3 shows a more detailed method 300 consistent with FIG. 1's embodiment. In FIG. 3's example, the method 300 starts at 302 wherein, upon receiving a request from a first entity to generate an entity trust profile, the trust profiler generates a trust profile for the first entity.

At block 304, the method 300 receives a plurality of identifiers from the first entity, wherein each identifier corresponds to different online source with which the first entity has interacted and/or expects to interact. In FIG. 1's example, the first entity 102 can provide identifiers (e.g., IP addresses, website addresses, user IDs, login-credentials for particular servers, and/or other identifiers), which specify that the first entity has relationships with online sources 104.

In block 306, the trust profiler uses the identifiers to gather trust records regarding the first entity from the respective online sources. These trust records describe behavioral information regarding the first entity with regards to each online source. For example, the trust profiler can query an auction website server to obtain an trust record from the auction site. The trust record from the auction site may indicate, for example, that the entity has engaged in 252 sales and 15 purchases, all with positive feedback and that the first entity has a feedback score of 2,542. The trust profiler can also query an online retailer server to obtain an trust record from the online retailer. The trust record from the online retailer may indicate, for example, that the first entity has a 92% positive feedback rating over the last twelve months. A trust record from a social networking website could also be obtained.

In block 308 the method determines a number of source scores for the first entity. Each of the source scores corresponds to a different online source with which the first entity interacts. For example, a source score for the auction website, a source score for the online retailer, and a source score for the social networking website can each be independently calculated. Each source score for any given site can account for the first entity's activity on the site. The source score may indicate, for example, whether the first entity has dealt fairly and honesty with other customers on the source. The source score may also account for the first entity's length of membership on that online source. In addition, the source score may also account for the length of time with which the trust profiler 112 has established a relationship with the online source. Factoring in the reliability of online sources may prevent manipulation of an individual trustworthiness score by registering a large number of dummy websites with the trust profiler.

In block 310, the method determines a base trustworthiness score for the first entity based on the number of source scores, for example by summing the number of source scores. Thus, the base trustworthiness score includes not only trustworthiness information of the first entity with regards to a single online source, but can include trustworthiness information of the first entity from multiple online sources. In this way, the base trustworthiness score may be more reliable then a single trustworthiness score.

In block 312, the method 300 applies an entity diversity multiplier to the base trustworthiness score to generate an overall trustworthiness score. The entity diversity multiplier takes into account how many different online sources from which trust records are gathered for the first entity. Thus, an entity that interacts with many different online sources will tend to have a higher overall trustworthiness score relative to an entity that deals with fewer online sources.

Finally, in block 314 the overall trustworthiness score of the first entity is provided to a second entity, so that the second entity can evaluate the trustworthiness of the first entity based on the over all trustworthiness score.

It will be appreciated that as the first entity continues to interact with the various online sources (and/or adds new online sources) in FIG. 3's method, the overall trustworthiness score of the first entity can be updated in view of this behavior. In this manner, the overall trustworthiness score reflects the continued and possibly up-to-the-minute trustworthiness of the first entity based on how the first entity is behaving with respect to a number of different online sources.

Figure 4:
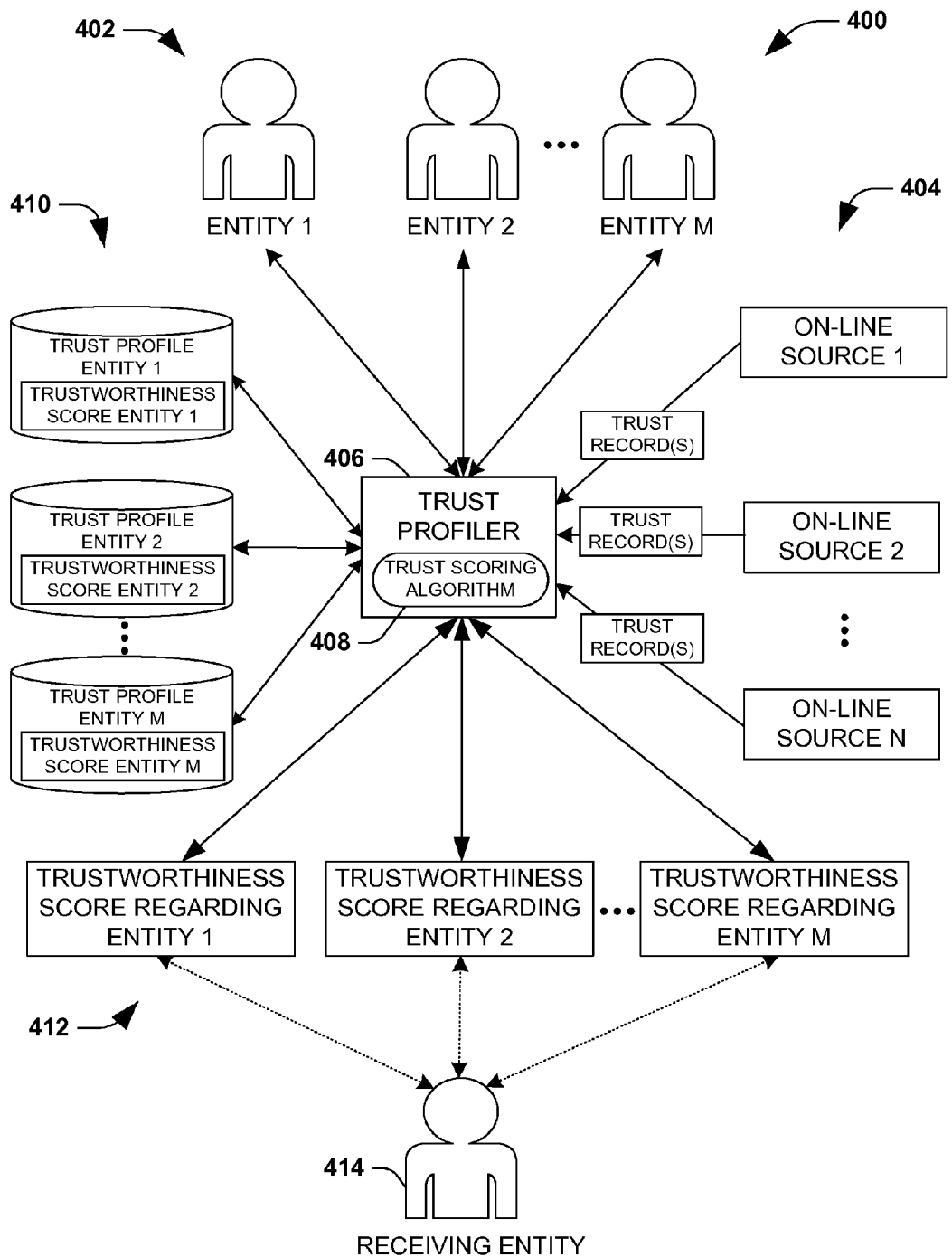
FIG. 4 relates to an example system where a number of different entities engage a trust profiler which generates respective trustworthiness scores for the respective entities based on a number of different online sources.

Referring generally to FIG. 4 illustrates a system where an online trust system 400 includes a number of different entities 402 that interact with a number of different online sources 404. In this example, a trust profiler 406, which includes a trust scoring algorithm 408, generates different trustworthy profiles 410 for the different entities, respectively. Again, the trustworthiness profiles 410 include trustworthiness scores 412 for the respective entities 402. The trustworthiness scores 412 are provided to a receiving entity 414, thereby allowing the receiving entity 414 to evaluate the relative trustworthiness of the entities 402 based on their respective trustworthiness scores 412.

In general, each of the entities 402 can interact with a different combination of online sources 404 relative to the other entities. For example, Entity 1 may interact only with Online source 1 (e.g., an auction website), while Entity 2 may interact only with Online Source 2 (e.g., an online retailer). Entity M may interact with Online sources 1, 2, and N (e.g., the auction website, the online retailer, and a social networking website). Thus, no particular correspondence between entities and online sources is implied by any discussion herein. Thus, depending on the implementation, the techniques disclosed herein can generate a trustworthiness score for entities interacting with the same online sources or interacting with different online sources.

Figure 5:
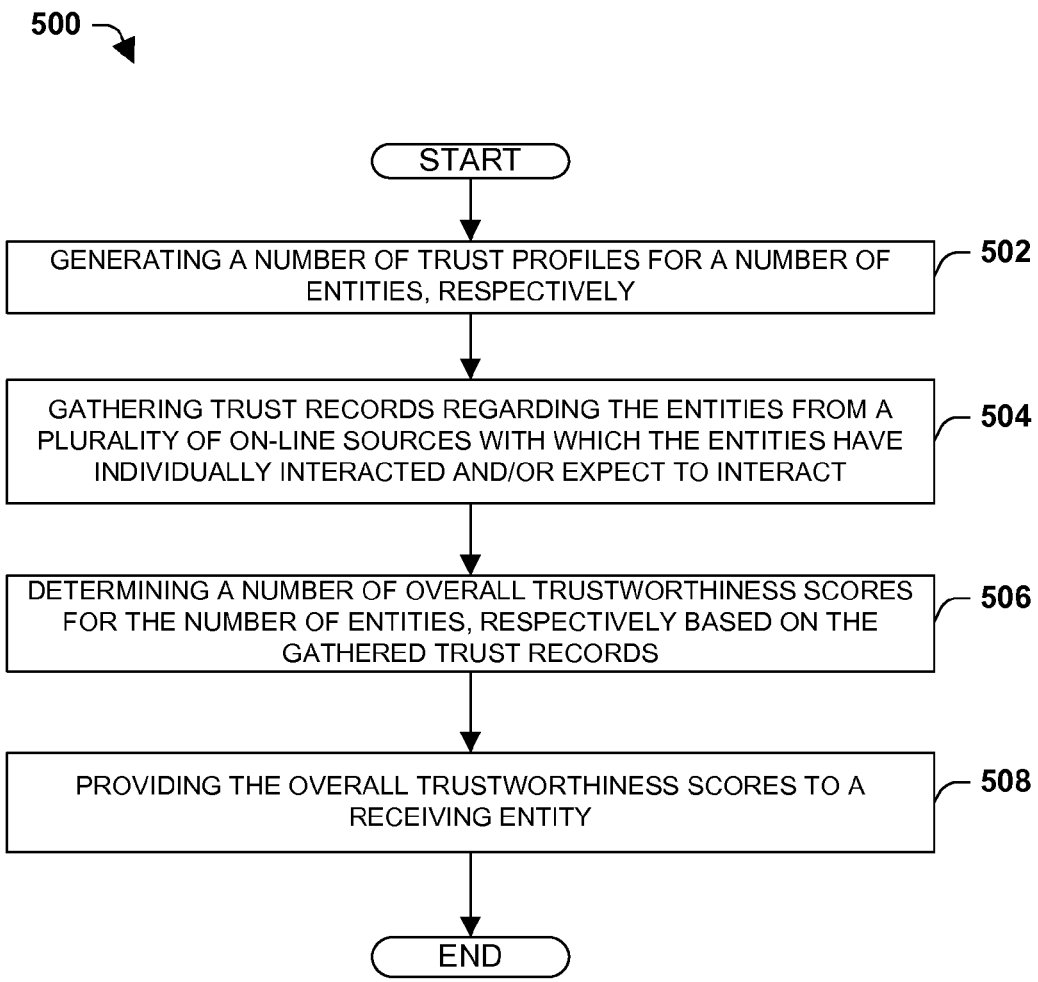
FIG. 5 relates to an example method where a number of different entities engage a trust profiler which generates respective trustworthiness scores for the respective entities based on a number of different entities.

FIG. 5 shows one example of method 500 consistent with FIG. 4's embodiment. The method 500 starts at 502, wherein a number of trust profiles (e.g., 410 in FIG. 4) are generated for a number of entities (e.g., 402 in FIG. 4), respectively. At block 504 the method gathers trust records regarding the respective entities from a number of online sources with which the entities have interacted and/or expect to interact. At block 506, overall trustworthiness scores (e.g., 412 in FIG. 4) for the respective entities are determined based on the gathered trust records. At block 508, the overall trustworthiness scores are provided to a receiving entity (e.g., 414 in FIG. 4), thereby allowing the receiving entity to evaluate the trustworthiness of the number of entities.

Figure 6:
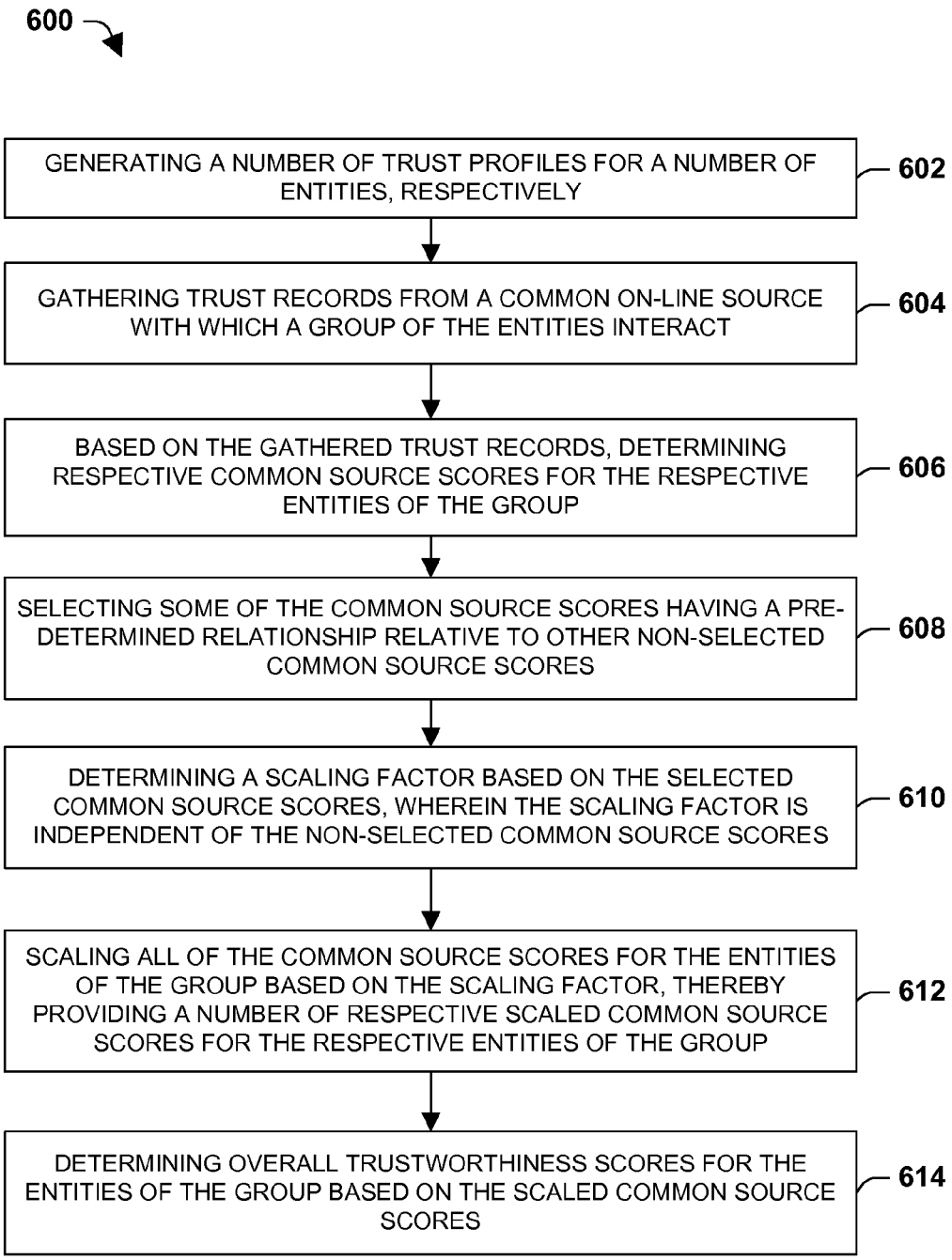
FIG. 6 relates to an example method where a number of different entities engage a trust profiler which generates respective trustworthiness scores for the respective entities based on a number of different entities.

FIG. 6 shows an embodiment that is more specific in some regards, in that this embodiment illustrates one example of how an entity's score may be scaled based on another entity's score for a particular online source. As will be appreciated in more detail below, in FIG. 6's embodiment a group of entities all interact with a common online source, and scale their scores relative to selected entities that have the highest scores for that common online source. For example, if a scaled source score has a maximum value of M points, each entity's scaled source score ($E_{scaled}$) can be calculated as follows:

$$E_{scaled} = (E_{source}/A) * M \quad 1.$$

Where $E_{source}$ is the entity's source score, and A is generated as a function of the top N % of all source scores (e.g., the statistical mean). So if an entity had a source score of 60/100, the highest source scores were all 100/100, and the maximum value for the scaled source score were 300, the entity's scaled source score would be 180 points and the highest scaled source scores would be 300 points.

Referring now to FIG. 6, method 600 starts at 602. At 602, the method generates a number of trust profiles for a number of entities, respectively. Each of the trustworthiness profiles can include a trustworthiness score corresponding to a particular entity.

At block 604, the method 600 gathers his trust records from a common online source with which a group of the entities interact. Thus, in an example where the online sources 404 in FIG. 4 include an auction website, an online retailer, and a social networking website; all entities in a group of two or more of the entities 402 can interact with the auction website (a common online source with regards to the group).

In block 606, the method 600 determines respective common source scores for the respective entities of the group, based on the gathered trust records. For example, if the individual entities of the group interact with the auction website, each of the individual entities can have a separate common source score that reflects that entity's interaction with the auction website. Thus, one of the entities of the group can have a relatively high common source score (relatively trustworthy), and another of the entities of the group can have a relatively low common source score (relatively untrustworthy).

In block 608, the method selects some of the common source scores which have a predetermined relationship relative to other non-selected common source scores. In one embodiment, the selected common source scores can all fall within a top percentile within all of the common source scores for the group. For example, if there are 100 entities with source scores for an auction website, the predetermined relationship may be fulfilled for the 5 entities with the highest common source scores.

In block 610 the method determines a scaling factor based on the selected common source scores. In the example with 100 entities in the group (10 of which having the highest scores are selected), a scaling factor may relate to the average common source score of the 10 selected entities. The scaling factor may be used as the value for A from equation 1.

In block 612 the method scales all of the common source scores for the entities of the group based on a scaling factor. In this way the method provides a number of respective scaled common source scores for the respective entities of the group.

Finally, in 614 the method determines overall trustworthiness scores for the entities of the group based on the scaled common source scores. This determination can include summing a number of different source scores for each entity, and multiplying the summed value by a diversity multiplier (see e.g., FIG. 3). These overall trustworthiness scores can then be provided to a receiving entity (e.g., FIG. 4 entity 414).

Figure 7:
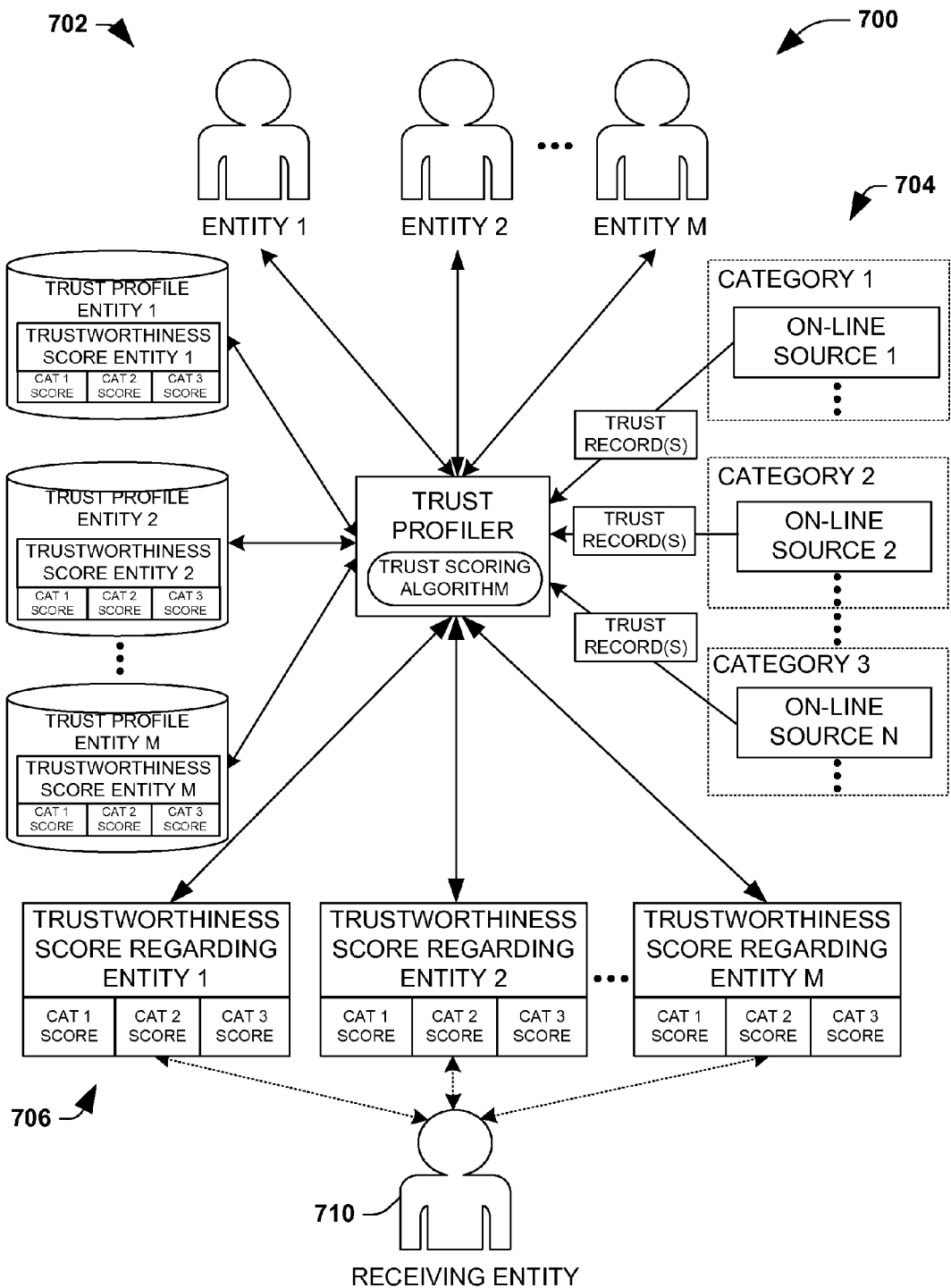
FIG. 7 relates to an example system where a trust profiler generates trustworthiness scores based on online sources that are categorized according to a number of different categories.

FIG. 7 illustrates an example system 700 where a number of different entities 702 interact with a number of different online sources 704 to generate corresponding trustworthiness scores 706 for the entities 702, respectively. Although this example is somewhat similar to the last, this example includes an additional concept whereby the online sources 704 are sorted according to different categories.

To reflect this multi-category classification, each entity's trustworthiness scores 706 can include multiple category scores, each of which reflects the entity's trustworthiness for a different category of online sources. Thus, in FIG. 7's example, the online sources are categorized according to three different categories, although any number of categories could be used in general. Example categories may include commercial, professional, social networking, academics, community, volunteer, special interest, and so forth. Each entity's trustworthiness score can include a first category score (e.g., indicating trustworthiness of the entity in a commercial context), a second category score (e.g., indicating trustworthiness of the entity in a professional context), a third category score (e.g., indicating trustworthiness of the entity in a social networking context), and so on.

Further, in some embodiments, entities' category scores with a given category can be scaled as a function of the highest scores within that given category. For example, all of the commercial category scores can be scaled based on the top 5% of commercial category scores across all entities, and/or all of the professional category scores can be scaled based on the top 10% of professional category scores across all entities. In this way entities do not have their trustworthiness scores scaled to an absolute reference frame within each category, but rather the scaling is relative to other entities.

By providing trustworthiness scores in this multi-faceted manner, a receiving entity 710 can evaluate different facets of an entity's behavior instead of merely the entity's overall online behavior. For example even if the other entity would not want to interact with an entity in a commercial context because the entity has a relatively low commercial score, the other entity may be willing to interact with the entity in a professional context because the entity's professional score is relatively high.

Figure 8:
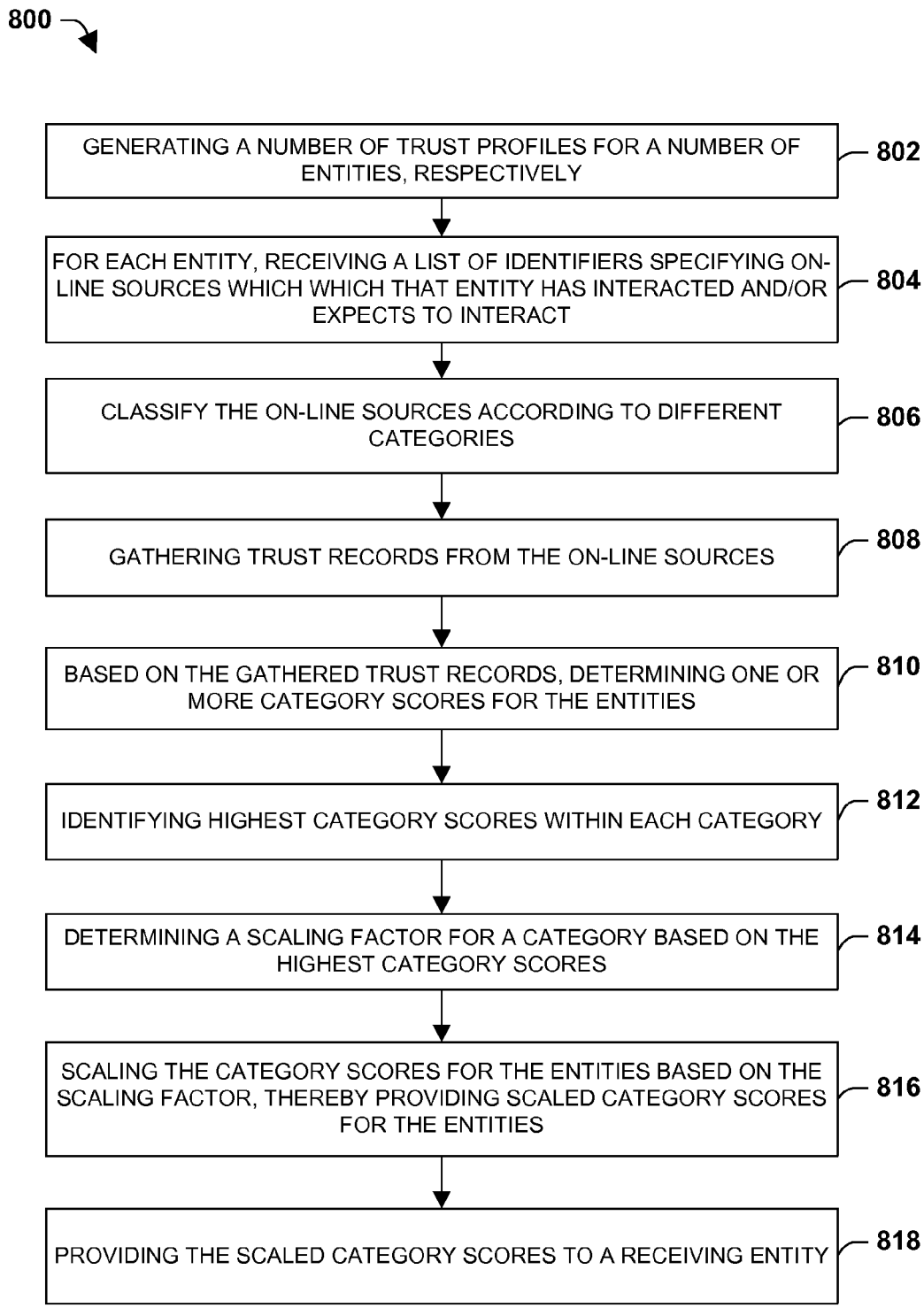
FIG. 8 relates to an example method where a trust profile generates trustworthiness scores based on online sources that are categorized according to a number of different categories.

FIG. 8, illustrates a method 800 that starts at 802 where a plurality of trust profiles are generated for a plurality of entities, respectively.

At block 804 the trust profiler receives a list of identifiers from each of the plurality of sources. These identifiers identify a number of online sources with which each entity interacts.

At block 806, the trust profiler classifies the online sources according to a number of different categories. In one embodiment, the categories could include commercial, professional, and social networking. However, in other embodiments, the categories could include commercial, professional, social networking, volunteering, community, as well as others in addition to or in place of those listed.

At block 808, the method 800 gathers trust records from the online sources.

In block 810, the method determines one or more category scores for the entities based on the gathered trust records.

In block 812, the method identifies the highest category scores within each category. Thus, the category scores are indexed relative to a slice of scores that are greater than a predetermined threshold.

In block 814, the method determines a scaling factor for a category based on the highest category scores.

In block 816, the category scores are scaled based on the scaling factors. In this way, a number of scaled category scores are provided for the entities.

Finally at block 818, the scaled category scales are provided to a receiving entity, thereby allowing the other entity to evaluate various facets of trustworthiness for the entities.

In some embodiments, a trustworthiness record for an entity includes information in regards to a referral score regarding the entity, wherein the referral score is provided by a referrer. In such instances, the value of the referral score can be based on a trustworthiness score of the referrer. In this way, entities that are deemed "trustworthy" carry more weight, relatively to less trustworthy entities, in determining the trustworthiness of other entities.

Also, although it has been mentioned above that some techniques may sum scores together, it will also be appreciated that demerit techniques can also be used by which "bad" behavior subtracts points from an entity's trustworthiness score.

In some embodiments, a trust profiler provides a receiving entity (e.g., 122 in FIG. 1, 414 in FIG. 4, 710 in FIG. 7) with trustworthiness indicia, which includes the trustworthiness score, and which can be embedded in a communication from the trust profiler to the receiving entity. This communication can take the form of an email message, or a website affiliated with the trust profile, a text message, etc. In some embodiments, the trustworthiness indicia includes an icon visually displayed on the communication. Also, in some embodiments, the trust profiler will provide the trustworthiness indicia to the entity associated with the trustworthiness score, to allow the entity associated with the trustworthiness score to pass its own trustworthiness score on to other entities in a reliable manner.

The claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

FIGS. 10*a*-10*h* relate to an illustrative example of data used and/or produced by described methods. A person having ordinary skill in the art will recognize that other methods could be used for evaluating trust of online entities. In this example, a first user, Aaron, may register with a trust profiler and request that the trust profiler generate a trust profile for Aaron. Aaron may provide the trust profiler with a number of identifiers that indicate to the trust profiler Aaron's credentials at a number of different sources. For example, Aaron may provide his login credentials for a number of websites including an auction site, an online retailer, a social networking site, a business networking site, and an online forum for bicycle hobbyists. A person having ordinary skill in the art will recognize that there may be non-website sources that Aaron could identify (e.g., a bank, an employer, a credit agency). In another example, sources may generate secure keys to provide to the trust profiler, allowing the trust profiler to access information regarding Aaron without Aaron having to provide his login credentials to the trust profiler.

Using the identifiers provided by Aaron, the trust profiler may obtain trust records from the various websites identified by Aaron. The trust records received from the websites may include different information depending on the records kept by the various websites. For example, a trust record from the auction site may include detailed records regarding Aaron's transaction history of sales and purchases in addition to feedback Aaron received based on his interactions with users. In another example, a trust record from the retail sales site may provide a numerical score generated based on similarly detailed records. A less detailed trust profile may be provided in situations where, for example, the source has a strict privacy policy. In another example, the trust record from the bicycle hobbyist forum may merely include the date Aaron registered with the forum and the number of actions Aaron has performed on the forum. The bicycle hobbyist forum may provide a less detailed trust record because the bicycle hobbyist forum does not keep detailed trust records.

Based on the trust records received from each of the websites, the trust profiler may generate a source score associated with each of the websites. FIG. 10*a* illustrates example data that may be used for generating source scores. In this example, a source score for the auction site is generated based on the length of time Aaron has been registered at the auction site (i.e., Membership Points), the length of time Aaron has shared with the trust profiler Aaron's credentials with the auction site (i.e., Time on Report), and the detailed records provided by the Auction site regarding Aaron's activities (i.e., Activity Points).

Example data used for calculating Membership Points are illustrated in FIG. 10*b*. Included in Aaron's trust profile received from the source is the length of time that Aaron has been a member at the source website. Depending on the amount of time Aaron has been a member at the source, the trust profiler assigns Aaron a number of points. In this example, Aaron has been a member at the source for 13 months. Therefore, Aaron earns 2 points per month for the first 12 months for a total of 24 points, and 3 points for the 13$^{th}$ month for a total of 27 points. Based on points earned by other users, Aaron's membership score may be weighted according to Equation 1 above where M in this example is 400.

Example data for calculating a Time on Report score are illustrated in FIG. 10c. Once Aaron associates his trust profile with his account on a source, the trust profiler may begin to keep track of the amount of time that Aaron has shared his trust profile from the source. In this example, Aaron earns 1 point per month, for a total of 1 point. The total number of points may be normalized according to Equation 1 above to create Aaron's Time on Report score.

Example data for calculating an Activity Score are illustrated in FIG. 10d. Based on the trust record regarding Aaron received by the trust profiler from the source, the trust profiler may generate reputation points that represent the credibility of Aaron's activities on the source. The reputation points may then be normalized according to Equation 1 above to generate adjusted reputation points. The adjusted reputation points may be summed with an out-of-score to create a total, which may then be normalized again according to Equation 1 to create Aaron's activity score. In one example, the reputation points may be derived from subjected measures of a user's credibility, whereas an out-of-score may be derived from an objective value. However, other measures may be used.

Referring back to FIG. 10a, a source score may be generated by summing the Membership Points, the Time on Report, and the Activity Points to obtain the Total Points. When the trust profiler is generating the source scores for Aaron, Aaron's source scores may also be weighted as a function of information that evaluates the trustworthiness of each individual website. This weighting accounts for the difference between the Total Points column and the Source Adjusted column. For example, if the bicycle hobbyist forum has less than a certain number of users, the forum may be seen as a less reliable indicator of trust than other sources. Therefore the trust profiler may multiply Aaron's source score associated with the bicycle forum by a coefficient that reduces the score's weight on Aaron's base score. In another example, if the social networking website is a new source that has not been validated by the trust profiler or if the trust profiler has reason to believe that the social networking website is untrustworthy, Aaron's source score for the social networking site may be reduced so the score has a reduced impact on other scores associated with Aaron's trust profile. Assigning sources their own credibility ratings may make it more difficult for a user to inflate their base trustworthiness score by creating a large number of dummy sites and registering the dummy sites with the trust profiler.

FIG. 10e illustrates example data a trust profiler may use to create global source scores for users. Once the trust profiler has generated adjusted source scores (see FIG. 10a) for each website Aaron identified, the trust profiler may generate a base trustworthiness score for Aaron based on the adjusted source scores. In one example, the trust profiler may simply average Aaron's adjusted source scores and multiply the average by a diversity modifier. Using the base score, the trust profiler may generate a global trust score for Aaron. The global trust score may incorporate Aaron's base trustworthiness score, a renaissance man score, and a referral score. The trust profiler may also rank users according to their trustworthiness compared to other users.

The diversity multiplier may be a value generated as a function of the total number of sources that are associated with Aaron's trust profile as illustrated in FIG. 10f. The trust profiler may determine the median number of sources associated with each entity. Based on the median, the trust profiler may generate ranges for various diversity multipliers. For example, in FIG. 10f, users associated with less than 60% of the median number of sources will have their base source score multiplied by 0.75, and users associated with greater than 140% of the median number of sources will have their base source score multiplied by 1.25. Users between 60% and 140% of the median will not have their base source score changed.

The renaissance man score may be generated based on the number of sources that are associated with Aaron's trust profile, as well as the number of categories that the sources are associated with as illustrated in FIG. 10g. For example, the auction site and the retail sales site may be associated with a commercial category. The social networking site may be associated with a social category. The business networking site may be associated with the professional category. And the bicycle hobbyist forum may be associated with the special interest and the social categories. A person having ordinary skill in the art can see how different types of websites may fit into a number of different categories. The renaissance man score may be normalized according to Equation 1.

The referral score may be generated based on referrals the trust profiler has received regarding Aaron from other trust profiler users. In calculating the referral score, the trust profiler may give greater weight to referrals received from users with higher global trust scores than referrals received from users with lower global trust scores.

The trust profiler may also generate category scores for Aaron using data as illustrated in FIG. 10h. A category score may be generated based on sources associated with the category. Thus, using the example category associations from above, Aaron's social category score may be generated based on his source scores from the social networking website, the business networking website, and the bicycle hobbyist website. In this example, the category score is generated by normalizing according to Equation 1, the average trust scores received by Aaron in each category. Category scores may also take into account the number of sources from which Aaron has provided trust records associated with the category.

Now that Aaron has a global trust score and category scores, another user, Beth, may request these scores from the trust profiler so that she can evaluate how she wants to interact with Aaron. For example, if Aaron has a low global trust score relative to other users, Beth may be less inclined to purchase something from Aaron on the auction website. However, even if Aaron's global trust score is low compared to other users, if Aaron's social category score is high compared to other users, Beth may still be willing to give Aaron's opinion on the bicycle hobbyist forum greater weight despite Aaron's low global score. In one example, the trust data may be provided to Beth in a manner that does not reveal Aaron's identity to Beth.

Figure 9:
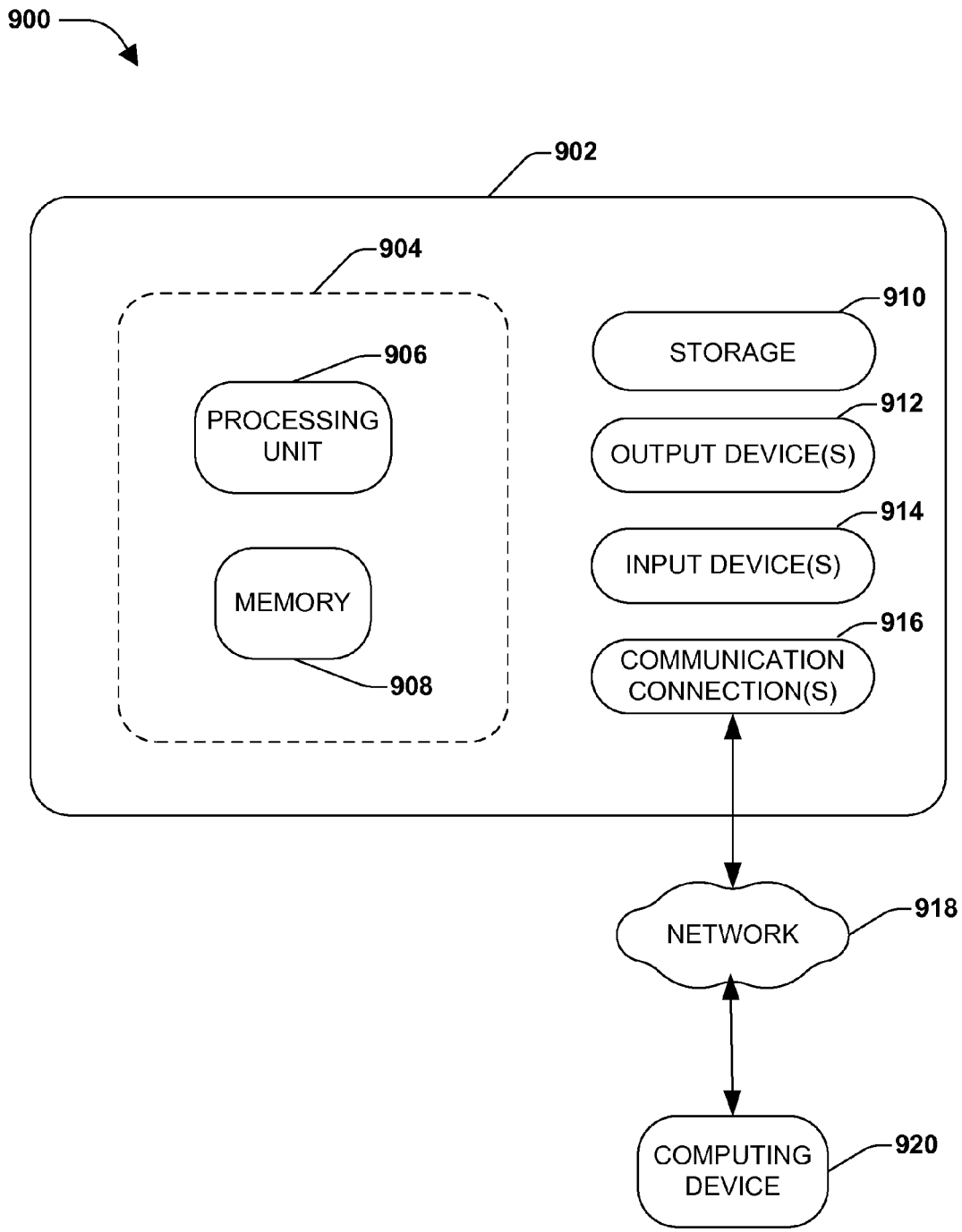
FIG. 9 illustrates an exemplary computing environment wherein one or more of the provisions set forth herein may be implemented.

FIG. 9 and the following discussion provide a brief, general description of a suitable computing environment to implement embodiments of one or more of the provisions set forth herein. The operating environment of FIG. 9 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 9 illustrates an example of a system 900 comprising a computing device 902 configured to implement one or more embodiments provided herein. In one configuration, computing device 902 includes at least one processing unit 906 and memory 908. Depending on the exact configuration and type of computing device, memory 908 may be volatile (such as RAM, for example), non-volatile (such as ROM, flash memory, etc., for example) or some combination of the two. This configuration is illustrated in FIG. 9 by dashed line 904.

In other embodiments, device 902 may include additional features and/or functionality. For example, device 902 may also include additional storage (e.g., removable and/or non-removable) including, but not limited to, magnetic storage, optical storage, and the like. Such additional storage is illustrated in FIG. 9 by storage 910. In one embodiment, computer readable instructions to implement one or more embodiments provided herein may be in storage 910. Storage 910 may also store other computer readable instructions to implement an operating system, an application program, and the like. Computer readable instructions may be loaded in memory 908 for execution by processing unit 906, for example.

The term "computer readable media" as used herein includes computer storage media. Computer storage media includes volatile and nonvolatile, removable and non-removable media implemented in any method or technology for storage of information such as computer readable instructions or other data. Memory 908 and storage 910 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 902. Any such computer storage media may be part of device 902.

Device 902 may also include communication connection(s) 916 that allows device 902 to communicate with other devices. Communication connection(s) 916 may include, but is not limited to, a modem, a Network Interface Card (NIC), an integrated network interface, a radio frequency transmitter/receiver, an infrared port, a USB connection, or other interfaces for connecting computing device 902 to other computing devices. Communication connection(s) 916 may include a wired connection or a wireless connection. Communication connection(s) 916 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 902 may include input device(s) 914 such as keyboard, mouse, pen, voice input device, touch input device, infrared cameras, video input devices, and/or any other input device. Output device(s) 912 such as one or more displays, speakers, printers, and/or any other output device may also be included in device 902. Input device(s) 914 and output device(s) 912 may be connected to device 902 via a wired connection, wireless connection, or any combination thereof. In one embodiment, an input device or an output device from another computing device may be used as input device(s) 914 or output device(s) 912 for computing device 902.

Components of computing device 902 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 902 may be interconnected by a network. For example, memory 908 may be comprised of multiple physical memory units located in different physical locations interconnected by a network.

Those skilled in the art will realize that storage devices utilized to store computer readable instructions may be distributed across a network. For example, a computing device 920 accessible via network 918 may store computer readable instructions to implement one or more embodiments provided herein. Computing device 902 may access computing device 920 and download a part or all of the computer readable instructions for execution. Alternatively, computing device 902 may download pieces of the computer readable instructions, as needed, or some instructions may be executed at computing device 902 and some at computing device 920.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method comprising:
receiving a plurality of online source identifiers from a first entity, wherein the plurality of online source identifiers identify in a one-to-one manner a plurality of different, respective online sources with which the first entity has interacted or expects to interact;
based on the identifiers, gathering trust records of the first entity from the respective online sources, wherein a trust record from an online source describes behavioral information regarding the first entity with regards to the online source;
determining a base trustworthiness score of the first entity based on the gathered trust records; and
multiplying the base trustworthiness score by an entity diversity multiplier to generate an overall trustworthiness score for the first entity, wherein the entity diversity multiplier that takes into account how many different online sites from which behavioral information is gathered for the first entity and where the entity diversity multiplier for the first entity differs from entity diversity multipliers for other respective entities.

2. The method of claim 1, further comprising:
providing the overall trustworthiness score of the first entity to a second entity so the second entity can evaluate trustworthiness of the first entity based on the overall trustworthiness score.

3. The method of claim 1, wherein the overall trustworthiness score is a numerical value ranging between a predetermined maximum value and a predetermined minimum value.

4. The method of claim 1, wherein the base trustworthiness score is also based on a referral score generated based, at least in part, on a referral provided by a referrer.

5. The method of claim 4, wherein a value of the referral score is based on a trustworthiness score of the referrer.

6. A method of comprising:
receiving a plurality of online source identifiers from a first entity, wherein the plurality of online source identifiers identify in a one-to-one manner a plurality of different, respective online sources with which the first entity has interacted or expects to interact;
based on the online source identifiers, gathering trust records of the first entity from the respective online sources, wherein a trust record from an online source describes behavioral information regarding the first entity with regards to the online source;
determining a base trustworthiness score of the first entity based on the gathered trust records;
determining a number of source scores for the first entity, wherein the source scores respectively correspond to the number of online sources in a one to one manner; and
determining the base trustworthiness score of the first entity based on the number of source scores for the first entity.

7. The method of claim 6, wherein a source score for the first entity for an online source accounts for activity of the first entity on the online source and a length of time during which the first entity has interacted with the online source.

8. The method of claim 7, wherein the source score also accounts for the length of time with which a trust profiler has established a relationship with the online source.

9. The method of claim 6, wherein a source score is weighted as a function of information that evaluates trustworthiness of a source with which the source score is associated.

10. A method of determining trustworthiness scores in an online environment, comprising:
receiving from a first entity a first list specifying a first plurality of online sites with which the first entity has interacted or expects to interact;
gathering behavioral information regarding trustworthiness of the first entity from the first plurality of online sites;
receiving from a second entity a second list specifying a second plurality of online sites with which the second entity has interacted or expects to interact;
gathering behavioral information regarding trustworthiness of the second entity from the second plurality of online sites;
generating a first base trustworthiness score for the first entity based on the behavioral information gathered from the first plurality of online sites;
generating a second base trustworthiness score for the second entity based on the behavioral information gathered from the second plurality of online sites;
providing first and second overall trustworthiness scores to a receiving entity based on the first and second base trustworthiness scores, respectively, thereby allowing the receiving to evaluate the trustworthiness of the first and second entities based on the first and second overall trustworthiness scores, respectively; and
based on whether the first trustworthiness score meets a predetermined set of criteria, selectively scaling the second base trustworthiness score as a function of the first base trustworthiness score.

11. The method of claim 10, wherein the first plurality of online sites is different from the second plurality of online sites.

12. The method of claim 10, wherein the first plurality of online sites is the same as the second plurality of online sites.

13. The method of claim 10, wherein the first plurality of online sites and the second plurality of online sites are both classified according to a number of different categories.

14. The method of claim 13, wherein the number of different categories comprises one or more of a social category, a professional category, a commercial category, an academic category, a community category, a special interest category, and a volunteer category.

15. The method of claim 13, wherein the first base trustworthiness score is generated based on a quantity of the first plurality of online sites and based on a quantity of categories with which members of the first plurality of online sites are associated.

16. The method of claim 13, further comprising:
    determining a first category score for the first entity, wherein the first category score is based on behavioral information gathered from at least one of the first plurality of online sites, wherein at least one of the first plurality of online sites is associated with a first category of the number of different categories;
    determining a first category score for the second entity based on behavioral information gathered from at least one of the second plurality of online sites, wherein at least one of the second plurality of online sites is associated with the first category; and
    if the first category score for the first entity meets a first set of criteria, then scaling the first category score for the second entity based on the first category score for the first entity.

17. The method of claim 16, wherein the first set of criteria is met if the first category score for the first entity is higher than a predetermined percentage of category scores for other respective entities.

18. A method of determining trustworthiness scores in an online environment, comprising:
    gathering trust records from a common online source with which a group of entities individually interact;
    based on the gathered trust records, determining respective common online source scores for the respective entities of the group;
    selecting some of the common online source scores which have a pre-determined relationship relative to other non-selected common online source scores;
    scaling the respective common online source scores for the respective entities of the group based on a scaling factor derived from the selected common online source scores.

19. The method of claim 18, further comprising:
    determining respective overall trustworthiness scores for the respective entities of the group based on the scaled common online source scores.

20. The method of claim 19, further comprising:
    providing the overall trustworthiness scores to a receiving entity, thereby allowing the receiving entity to evaluate trustworthiness of the respective entities.

21. The method of claim 19, wherein determining the respective overall trustworthiness scores for the respective entities is also based on respective source scores for the entities from other online sources.

* * * * *